(12) United States Patent
Wager et al.

(10) Patent No.: US 7,733,773 B2
(45) Date of Patent: Jun. 8, 2010

(54) PLAYOUT BASED DELAY SCHEDULER

(75) Inventors: Stefan Wager, Esbo (FI); Janne Peisa, Espoo (FI); Mats Sagfors, Yrkslatt (FI); Johan Torsner, Masaby (FI); Per Synnergren, Luleá (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 583 days.

(21) Appl. No.: 11/685,357

(22) Filed: Mar. 13, 2007

(65) Prior Publication Data
US 2008/0095198 A1 Apr. 24, 2008

Related U.S. Application Data (60) Provisional application No. 60/852,432, filed on Oct. 18, 2006.

(51) Int. Cl.
*H04L 12/26* (2006.01)
*H04L 12/54* (2006.01)

(52) U.S. Cl. .................. 370/230; 370/235; 370/252; 370/428

(58) Field of Classification Search .............. None
See application file for complete search history.

(56) References Cited

U.S. PATENT DOCUMENTS

| | | | | |
|---|---|---|---|---|
| 6,205,150 | B1 * | 3/2001 | Ruszczyk | 370/412 |
| 6,985,459 | B2 | 1/2006 | Dickson | |
| 7,440,430 | B1 * | 10/2008 | Jagadeesan et al. | 370/331 |
| 7,558,869 | B2 * | 7/2009 | Leon et al. | 709/231 |
| 2002/0097750 | A1 | 7/2002 | Gunaseelan et al. | |
| 2002/0131434 | A1 | 9/2002 | Vukovic et al. | |
| 2003/0061371 | A1 | 3/2003 | Deshpande | |
| 2003/0156218 | A1 * | 8/2003 | Laksono | 348/388.1 |
| 2004/0186877 | A1 | 9/2004 | Wang et al. | |
| 2005/0213587 | A1 * | 9/2005 | Cho et al. | 370/395.42 |
| 2005/0232154 | A1 * | 10/2005 | Bang et al. | 370/235 |
| 2006/0215676 | A1 * | 9/2006 | Ratakonda et al. | 370/412 |
| 2007/0258365 | A1 * | 11/2007 | Das et al. | 370/230 |
| 2007/0286146 | A1 * | 12/2007 | Kuroda et al. | 370/342 |
| 2007/0297401 | A1 * | 12/2007 | Bosch et al. | 370/389 |

OTHER PUBLICATIONS

International Search Report and Written Opinion mailed Feb. 26, 2008 in corresponding PCT application PCT/SE2007/050471.
Hosein, "QoS Control for WCDMA High Speed Packet Data", In 4th International Workshop on Mobile and Wireless Communications Network, 2002., pp. 169-173.

* cited by examiner

*Primary Examiner*—Chi H Pham
*Assistant Examiner*—Soon-Dong D Hyun
(74) *Attorney, Agent, or Firm*—Nixon & Vanderhye, P.C.

(57) ABSTRACT

A node (22) of a telecommunications network (2) receives, over a transmission chain (24) subject to packet jitter, packets of a connection involving a client device (26). The node (22) comprises a packet buffer (38) configured to store the packets received over the transmission chain prior to transmission of the packets to the client device (26). The node (22) further comprises a client-conscious scheduler (40) which is configured to schedule the transmission of the packets from the packet buffer (38) over a channel (32) to the client device (26) in accordance with a timing consideration of the client device (26). In an example embodiment, the timing consideration of the client device (26) which is taken into account by the scheduler (40) is avoidance of drain of a playout buffer of the client device.

18 Claims, 5 Drawing Sheets

PLAYOUT BASED DELAY SCHEDULER

This application claims the benefit and priority of U.S. provisional patent application Ser. No. 60/852,432 filed Oct. 18, 2006, which is incorporated herein by reference in its entirety.

BACKGROUND

I. Technical Field

The present invention pertains to telecommunications, and particularly to the mitigation of jitter in traffic communicated between network nodes.

II. Related Art and Other Considerations

In many types of communications network, traffic (typically in the form of a stream or flow of data packets) is transmitted over a channel or link between a network sending node and another network (receiving) node or a terminal. The transmission of such packets is generally performed in conjunction with provision of some type of service utilized by client (e.g., a client application which is executed at terminal of the network, for example). Some of these services (such as streaming media, for example) are very sensitive to delay, meaning that quality of the service is very dependent upon timely delivery of the packets to the client.

A packet is often stored or buffered by the sending node in a queue or "buffer" of the sending node until such time as it is deemed appropriate for the packet to be "scheduled" out of the sending node for transmission (over the channel, link, or interface) to a receiving node or terminal. The sending node often employs a scheduler or scheduling algorithm for determining when a packet is to be transmitted to the receiving node or terminal.

Conventional schedulers and/or scheduling algorithms for delay sensitive services typically make scheduling decisions (for determining when to transmit a packet out of a scheduling buffer of a node for transmission, e.g., to another node) on the basis of a length or time (e.g., delay) that the packet has experienced, e.g., in the buffer. Such scheduling algorithms are described by, e.g., Hosein, P. A, "Qos Control For WCDMA High Speed Packet Data", 4th International Workshop on Mobile and Wireless Communications Network, 2002, pages 169-173, 2002, incorporated herein by reference. Thus, delay is usually measured as the time each packet has spent in the scheduling buffer. Given a certain maximum delay requirement of a flow, the scheduling algorithm is designed so that priority is increased as the delay threshold is approached. The basic approach of the conventional scheduling algorithms is to guarantee delivery before a deadline, but also to allow non-delay sensitive traffic to be scheduled (e.g., non-delay sensitive packets to be read out of the buffer) if time allows.

Figure 1:
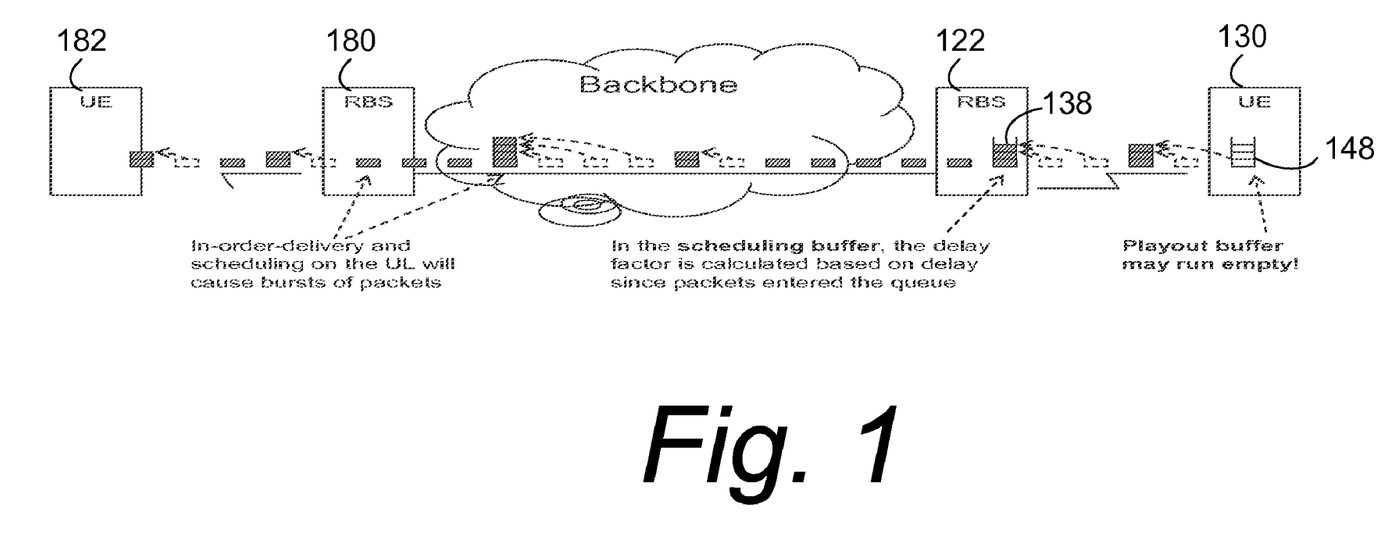
FIG. 1 is a diagrammatic view showing jitter in an example transmission chain of a network.

Consider, for example, a connection in which a radio base station (also called in a "NodeB" in some RAN contexts) is receiving traffic in the form of packets from a backbone network or another node in a radio access network (RAN), in the manner generally depicted in FIG. 1. The wireless terminal 130 receives the packets for, e.g., use in a client application program executed at the wireless terminal. The client application may be, for example, a streaming player (such as Realplayer, for example). The traffic may have been received over cascaded radio links (e.g., originated by a sending wireless terminal 182 and over a radio interface and through the radio access network) or received in a transmission chain which similarly imposes jitter. "Jitter" is the variation in the time between packets arriving, caused by network congestion, timing drift, or route changes.

For example, the packets received by the radio base station 122 of FIG. 1 are obtained from a transmission chain comprising a backbone network, another radio base station 180, and a sending wireless terminal 182. In-order delivery and scheduling on the uplink from sending wireless terminal 182 toward, e.g., the backbone network, will cause jitter and resulting bursts of packets. In FIG. 1, data flows from left to right, and packets stacked on one another depict packet bursts (broken lines point to positions the packets would occupy if the burst had not occurred). Each burst is seen by every node in the transmission chain after the point were the jitter occurred.

Figure 2:
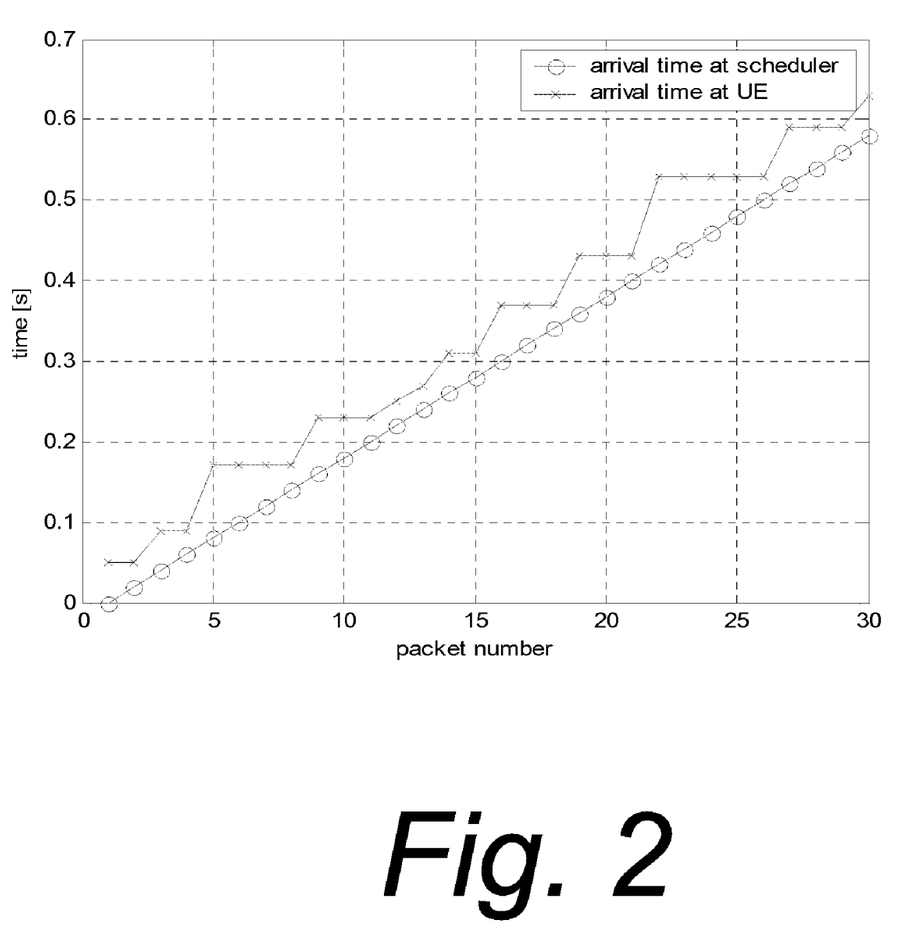
FIG. 2 is a graph showing jitter in incoming traffic at a radio base station due to uplink scheduling.

The radio base station 122 stores the packets in a scheduling buffer 138 until such as time as is deemed appropriate for transmitting the packets over the air interface to the wireless terminal 130 (e.g., the scheduler of node 122 determines a delay factor calculated based on the delay since the packets entered scheduling buffer 138). Of the packets arriving at the radio base station, the first such packets have experienced the most or greatest delay. Thus, packets entering the scheduling queue will have spent different amounts of time in the network. Basing the scheduling priority on the time spent in the scheduling buffer will cause or convey a jitter in the traffic entering the wireless terminal 130, such as that depicted in FIG. 2.

As the packets are received at the wireless terminal from the sending node, the packets are stored in a playout buffer 148 by the client application of the wireless terminal 130. The packets are read out from the playout buffer 148 by the client application in accordance with (e.g., at a time determined by) the client application.

The problem with such conventional scheduling algorithms is that, in a system with cascaded radio links (or any other sources for jitter in the transmission chain before the scheduler), the delay scheduler/scheduling algorithm is not aware of the remaining delay budget of each individual packet. That is, the delay scheduler/scheduling algorithm is not aware of how long the packet can stay in the scheduling buffer 138 of node 122 before the packet retention causes the playout buffer 148 in terminal 130 to be drained of packets or go dry. Drainage of the playout buffer, attributable to the jitter, is not at all desirable and should be avoided.

Conventionally the jitter in the traffic entering the wireless terminal is handled or mitigated in and by the wireless buffer. From a theoretical vantage point, in order to be able to most effectively handle jitter, the wireless terminal should be aware of the expected jitter on the incoming traffic. Though this is (at least in theory) possible, in practice it is difficult to share jitter-related information between the network and the client application of the wireless terminal which is receiving the packets. What typically happens therefore, in state of the art scheduling, is that the client application has to "prebuffer" a certain amount of data in the client's playout buffer before starting the playout. In so doing, the amount of data that is prebuffered should correspond to the expected amount of jitter in the transmission chain.

What is needed, and an object of the present invention, are one or more of apparatus, method, and technique for mitigating jitter in a telecommunications system.

BRIEF SUMMARY

In one of its aspects, the technology involves a node of a telecommunications network which receives, over a transmission chain subject to packet jitter, packets of a connection involving a client device. The node comprises a packet buffer configured to store the packets received over the transmission chain prior to transmission of the packets to the client device. The node further comprises a client-conscious scheduler which is configured to schedule the transmission of the packets from the packet buffer over a channel to the client device in accordance with a timing consideration of the client device.

In an example embodiment, the timing consideration of the client device which is taken into account by the scheduler is avoidance of drain of a playout buffer of the client device.

In an example implementation, the scheduler comprises a process configured to execute a software program comprising instructions stored on a tangible media. When executed the program maintains a variable known as transmission deadline, or "d". The transmission deadline variable is indicative of the time at which the transmission of the packet should occur from the scheduling buffer to prevent the playout buffer from draining. This transmission deadline variable d is not constant, but varies with time depending on the time each packet has spent in the network before reaching the scheduler. For each transmission time interval (TTI) of the connection, the program decreases the transmission deadline variable by an amount comparable to the transmission time interval (TTI). For each transmission of a frame(s), the program increases the transmission deadline variable by an amount comparable to a product of a number of frame(s) transmitted and a frame inter-arrival time.

The connection on whose behalf the scheduler is working could participate in one of several different types of services. For example, the connection may be associated with a service which is of the type in which the frame inter-arrival time is constant. For example, the service may be of a type which utilizes a codec, and the codec may have a constant frame inter-arrival time. On the other hand, as another example, for other types of services the frame inter-arrival time may vary. In determining or updating the value of transmission deadline variable d, the scheduler takes into consideration the appropriate value to use for the frame inter-arrival time, whether constant or variable.

In an example implementation, when the frame inter-arrival time is variable, the program determines the frame inter-arrival time with reference to information carried in the packets. Such information can be information carried in a packet header, such as a time stamp, for example.

In an example variation, the program can also detect a lost packet and, upon such detection, increase the transmission deadline variable by an amount comparable to the transmission time interval (TTI).

As a ramification of its client-conscious operation, the scheduler can prebuffer an amount of data that corresponds to a maximum jitter allowed for a connection. Since the scheduler is a main source of jitter in the transmission chain, scheduler will have the best knowledge of the transmission jitter, and thereby determine the proper prebuffer amount. By the scheduler supervising the prebuffering, the receiving terminal or client device at the receiving device does not need to prebuffer data prior to initial playout, and therefore can begin playout immediately at reception of the first packet without risk of the playout buffer being drained.

Another aspect of the technology involves a method of operating a node of a communications network. The method basically comprises (1) receiving, over a transmission chain subject to packet jitter, packets of a connection involving a client device; (2) storing the packets received over the transmission chain in a packet buffer; and scheduling transmission of the packets from the packet buffer over a channel to the client device in accordance with the timing consideration of the client device. As mentioned above, in an example mode of operation, the timing consideration of the client device can be avoidance of drain of a playout buffer of the client device. The method can further involve acts such as those aforementioned in conjunction with the software program, although such acts can be performed in ways other than performance of a software program, e.g., by state machine or circuit execution, for example.

The technology thus facilitates jitter buffer design in the client and minimizes the pre-buffering delay in the client device. The client-conscious scheduler can start a new session by buffering an amount of data that corresponds to the maximum jitter allowed for the connection. By doing this, the client can begin playout immediately at reception of the first packet, without risk of the playout buffer draining.

The strategy of the technology works for any source with a fixed frame interval as well as variable inter-arrival time (e.g., variable frame interval). An example of a fixed frame interval service for which the technology is appropriate is speech, like voice over internet (VoIP), but it can also be applied to streaming services with a fixed frame interval.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 3:
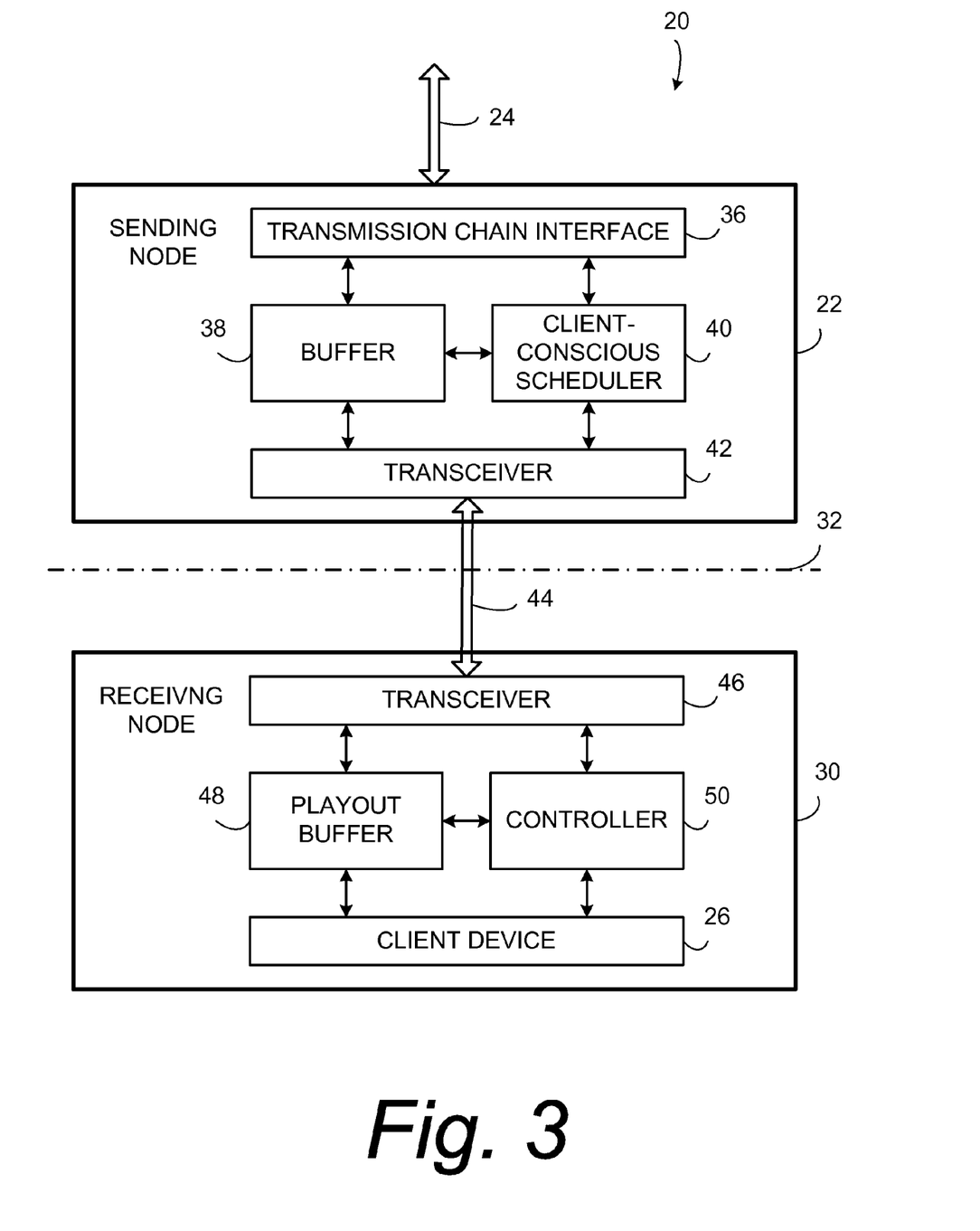
FIG. 3 is a diagrammatic view showing a portion of an example embodiment of a telecommunications network comprising a sending node and a receiving node.

FIG. 3 shows a telecommunications network 20 comprising a node 22 which receives, over a transmission chain 24, packets of a connection involving a client device 26 (sometimes also referred to or known as a "client"). As used herein, "frame" is understood to be a frame such as a voice frame that constitutes one packet. Although the transmission chain 24 is represented in FIG. 3 by an arrow for sake of simplicity, it should be appreciated that, in various possible contexts, transmission chain 24 comprises one or more of the following: one or more nodes of a radio access network; a backbone network; and/or a radio frequency channel or link. For example, the transmission chain 24 of FIG. 3 could be comparable to that of FIG. 1. Typically the transmission chain 24 is of a type which is subject to packet jitter.

The client device 26 is shown in FIG. 3 as being situated in or hosted by a node or terminal 30. Packets are transmitted from node 22 to interface 30 over an air or radio interface 32. Thus, terminal 30 is a wireless terminal, and can also be termed (for example) a mobile station, a mobile terminal, or a user equipment unit (UE), and thus can be represented by such appliances as a mobile telephone ("cellular" telephone) and/or laptop with mobile termination, and thus can be, for example, portable, pocket, hand-held, computer-included, or car-mounted mobile devices which communicate voice and/ or data with radio access network. Alternatively, the wireless terminal can be a fixed wireless device, e.g., a fixed cellular device/terminal which is part of a wireless local loop or the like. The client device 26 is typically an application which is executed on a processor or controller or the like of the terminal 30 for facilitating participation in a communication or media service, such as conversation, voice over internet (VoIP), streaming media, or the like.

The node 22 comprises an interface 36 (for interacting, e.g., with a next immediate member in transmission chain 24) and through which packets of the connection are received; packet buffer 38; scheduler 40; and transceiver 42. The packet buffer 32 stores the packets received over the transmission chain 24 (via interface 36). The scheduler 40 is responsible for determining the timing of the scheduling or transmission of packet(s) out of packet buffer 32. The transceiver 42 comprises the logic and equipment for preparing the packets for transmission and actually transmitting the packets on an appropriate channel 44 over radio interface 32. Thus, transceiver 42 includes, e.g., amplifiers, combiners, filters, and antenna, such as that typically found in a radio base station or NodeB, for example. The person skilled in the art will appreciate that a node such as node 22 comprises many other functionalities, but that only those directly germane to the current technology are presently illustrated.

Unlike conventional schedulers, scheduler 40 does not use length of time a packet spends in packet buffer 38 (or packet delay) as its primary criteria for determining when to transmit a packet over radio interface 32 to terminal 30. Rather, scheduler 40 is said to be a "client-conscious scheduler" in the sense that it is configured to schedule the transmission of the packets from the packet buffer (38) over channel 44 to client device 26 in accordance with a timing consideration of the client device 26. As explained herein, in an example embodiment the timing consideration of the client device 26 which is taken into account by scheduler 40 is avoidance of drain of a playout buffer of client device 26.

As mentioned above, client device 26 is situated in or hosted by wireless terminal 30. The terminal 30 also comprises transceiver 46; playout buffer 48 for client device 26; and controller or processor 50. As also previously indicated, client device 26 can be an application program executed by a processor, such as controller 50 (for example). Again, the person skilled in the art will appreciate that terminal 30 indeed comprises many other functionalities, only those directly germane to the current technology being presently illustrated.

Figure 4:
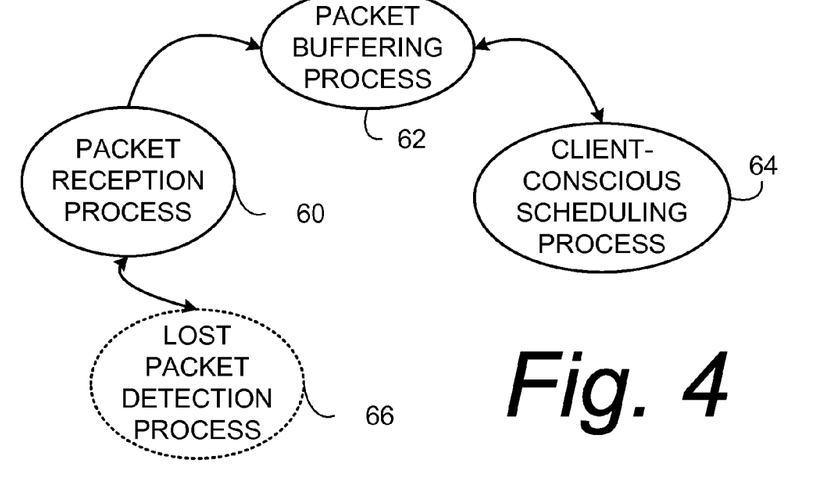
FIG. 4 is a diagrammatic view showing example, non-limiting processes performed in an example embodiment of a sending of the telecommunications network of FIG. 3.

The node 22 can be any sending node of a network which employs a scheduler such as scheduler 40 for transmitting packets to another node or terminal, such as a wireless terminal. The node 22 can, but need not exclusively, be a radio base station, such as a radio base station of a GMS network or a NodeB of a UTRAN radio access network, for example, In an example implementation, the functions of scheduler 40 can be performed by a controller or processor (as those terms are expansively explained above) of node 22. FIG. 4 illustrates three example processes which can be performed by a controller or processor of node 22: packet reception process 60; packet buffering process 62; and client-conscious scheduler process 64 (which essentially corresponds to the scheduler 40 mentioned above). In addition, FIG. 4 illustrates (by broken lines) a further and optional process which also may be present in some example embodiments: lost packet detection process 66. Each of these processes can be performed by executing a software program comprising instructions stored on a tangible media (e.g., magnetic or optical disk, tape, semiconductor memory, or the like, for example). These processes can be part of one program, or separate programs, if desired. In an example implementation, an instance of the processes (such as client-conscious scheduler process 64, for example) is executed for each connection being handled by scheduler 40.

The packet reception process 60 is primarily responsible for receiving packets via interface 36 from transmission chain 24 and processing those packets. The packets received and processed by packet reception process 60 are stored in packet buffer 38 by packet buffering process 62. The client-conscious scheduler process 64 is responsible for determining the time of transmission of the packet(s) from packet buffer 38 to terminal 30 over channel 44.

Figure 5:
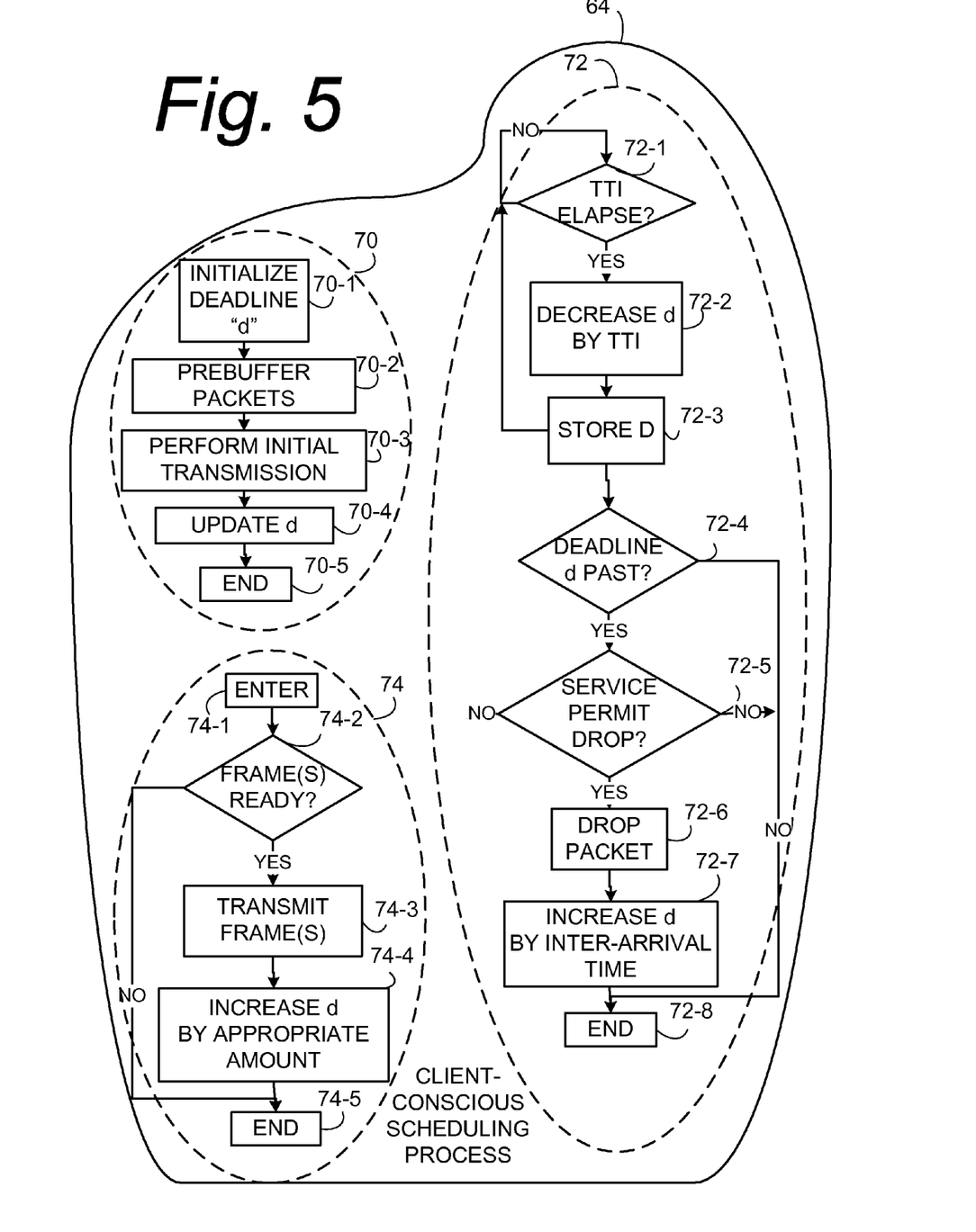
FIG. 5 is a flowchart showing example acts performed in conjunction with scheduling of packets from a sending node to a receiving node in accordance with an example, non-limiting mode of operation.

FIG. 5 illustrates example acts or steps performed, or events occurring, in conjunction with execution or performance of client-conscious scheduler process 64. In fact, FIG. 5 shows that, in an example, non-limiting implementation, client-conscious scheduler process 64 comprises three subprocesses or routines (each framed by dashed lines in FIG. 5): initial transmission routine 70; TTI clocking routine 72; and packet transmission routine 74.

In an example implementation, client-conscious scheduler process 64 maintains a variable known as transmission deadline, or "d". The transmission deadline variable "d" is indicative of the time at which the transmission of the packet(s) should occur from the scheduling buffer to prevent the playout buffer 48 of client device 26 from draining. This transmission deadline variable d is not constant, but varies with time depending on the time each packet has spent in the network before reaching the scheduler.

When the client device 26 begins participation in a telecommunications service, the initial packets of the connection are received by packet reception process 60 and stored by packet buffering process 62 in packet buffer 38. The initial transmission routine 70 of client-conscious scheduler process 64 is operative for determining when the initial packets of the connection are to be transmitted out of packet buffer 38 to client device 26. As shown in FIG. 5, when it begins its execution, as act 70-1 the initial transmission routine 70 initializes the value of the transmission deadline variable d. As act 70-2, initial transmission routine 70 works with packet buffering process 62 to assure that a predetermined number of packets (which now will be known as the initial packets) have been "prebuffered" in packet buffer 38. Preferably the number of packets prebuffered as act 70-2 at the beginning of a new session corresponds to the maximum jitter allowed for the radio connection between radio base station 122 and wireless terminal 30. Such jitter on this connection is caused by scheduling and retransmission, and can be determined or calculated by the radio base station 22 based on configuration of the retransmission protocol and configuration of the scheduler At an appropriate time, as act 70-3 initial transmission routine 70 authorizes transmission of the number of initial packets (e.g., the prebuffered packets) from packet buffer 38 over radio interface 32 to terminal 30. In conjunction with the transmission, as act 70-4 the initial transmission routine 70 updates the value of transmission deadline variable d before terminating at act 70-5.

Thus, scheduler 40 can prebuffer an amount of data that corresponds to a maximum jitter allowed for a connection. Since the scheduler 40 is a main source of jitter in the transmission chain, scheduler 40 has the best knowledge of the transmission jitter, and thereby determine the proper prebuffer amount.

The updating of the value of transmission deadline variable d as performed as act 70-4 takes into consideration both the number of packets transmitted and a packet inter-arrival time (e.g., the frame inter-arrival time). Specifically, in an example embodiment, at act 70-4 the initial transmission routine 70 adds the product of the number of packets transmitted and the packet inter-arrival time to the initialized value of transmission deadline variable d. The frame inter-arrival time is the time between frames being transmitted from the source. A further explanation of the frame inter-arrival time is provided subsequently. For now, if it is assumed that the frame inter-arrival time is constant and is 20 ms, and if four packets are to be initially transmitted, then as act 70-4 the product 4×20 ms is added to the initialized value of transmission deadline variable d, resulting in a current value of transmission deadline variable d as being 80 ms.

The TTI clocking routine 72 is responsible for keeping track of the elapse of each transmission time interval (TTI) and, for each lapse of a transmission time interval (TTI), decreasing the transmission deadline variable d by an amount comparable to the transmission time interval (TTI). The TTI clocking routine 72 thus maintains, or has access to, a clock of the node 22 by which TTI clocking routine 72 can determine (as act 72-1) when a transmission time interval (TTI) elapses. When a transmission time interval (TTI) does elapse, as act 72-2 the TTI clocking routine 72 decreases the value of transmission deadline variable d by the amount comparable to the transmission time interval (TTI). As act 72-3 the decreased value of transmission deadline variable d is stored as the current value of transmission deadline variable d.

Act 72-4 essentially involves determining whether scheduler 40 thinks that a packet(s) should be transmitted from the radio base station 22 in order to prevent the playout buffer 48 of terminal 30 from draining, e.g., whether the value of transmission deadline variable d has reached zero. If the value of transmission deadline variable d has not reached zero, processing is presumed to be proceeding normally and thus the current execution of the instance of TTI clocking routine 72 for the connection can be terminated, as reflected by act 72-8. The instance of TTI clocking routine 72 for the connection can be re-entered periodically or upon occurrence of an appropriate triggering event, such as another scheduling decision by scheduler 40.

If TTI clocking routine 72 determines that transmission has not occurred at a time that would prevent the playout buffer 48 of terminal 30 from being drained, e.g., that the value of transmission deadline variable d has reached zero, as act 72-5 the TTI clocking routine 72 checks whether the connection belongs to a service which permits packets to be dropped. An example of a service which permits packets to be dropped is a conversational service. Other types of services, such as unidirectional flows like streaming, for example, do not prefer packet dropping. Although in theory all services should tolerate packet drop, some services may prefer packet drop over added delay through buffering. If the service does not permit dropping of packets, the instance of the TTI clocking routine 72 for this connection essentially terminates as depicted by act 72-7. Not dropping of packets may lead to drain of playout buffer 48, but rebuffering of the content for some services (such as buffered unidirectional streaming) is preferable to packet drop.

If it is determined as act 72-5 that the service permits packet loss, and since the deadline associated with transmission deadline variable d has passed, as act 72-6 a packet is dropped. Since act 72-6 involves dropping a packet, act 72-7 requires that the value of transmission deadline variable d be increased by the packet inter-arrival time (e.g., the frame inter-arrival time). In other words, if the scheduling deadline is passed with packets still in the scheduling buffer, a packet is dropped and the time to deadline d increased by the frame inter-arrival time. Thereafter the instance of the TTI clocking routine 72 for this connection can be terminated (act 72-7). The instance of packet transmission routine 74 for the connection can be re-entered subsequently as described above.

FIG. 5 shows that TTI clocking routine 72 keeps monitoring for each elapse of transmission time interval (TTI) and repetitively performing the foregoing actions.

The packet transmission routine 74 encompasses acts 74-1 through 72-8 as illustrated in FIG. 5. Beginning of execution of packet transmission routine 74, depicted as an enter act 74-1, can occur periodically or upon receipt of an appropriate interrupt. For example, packet transmission routine 74 can be triggered by scheduler 40 making a scheduling decision (a prerequisite to the scheduling decision being the fact that at least some packets are stored in the packet buffer 38). The scheduling decision made by scheduler 40 can be based on various inputs, such as (for example) the transmission deadline variable d, the current radio link quality, etc. Based on such input, scheduler 40 decides to which user to transmit in each transmission time interval (TTI).

As act 74-2 a determination is made whether one or more frames (e.g., packets) are ready for transmission from packet buffer 38 to terminal 30 over radio interface 32. If a frame(s) is/are ready act 74-3 and act 74-4 are performed, followed by routine termination or suspension act 74-5. If a frame is not ready, the routine terminates or is suspended at act 74-5.

Act 74-3 involves authorizing or performing actual transmission of the frame(s) from packet buffer 38 to terminal 30. Such authorization or performance includes gating or otherwise passing the frame(s) from packet buffer 38 to transceiver 42. It will be appreciate that other processing steps may be performed preparatory to actual transmission of the frame by transceiver 42 over radio interface 32 to terminal 30. To reflect the transmission of the frame(s), as act 74-4 the packet transmission routine 74 increases the transmission deadline variable d by an amount comparable to a product of a number of frame(s) transmitted and a frame inter-arrival time. Further explanation of the frame inter-arrival time is provided subsequently.

Thus, as described above, instead of basing the delay factor on the time spent in the buffer, the scheduling decision made by scheduler 40 is based on when more data is needed in the receiver (e.g., terminal 30) to avoid the playout buffer 48 in the receiving terminal 30 from draining. For instance, if the scheduler 40 transmits at t=t1 three packets to the receiver 30, scheduler 40 knows that the next packet needs to be scheduled at latest at t=t1+3*20 ms, to avoid the playout buffer 48 being drained.

As described above with reference to an example embodiment of FIG. 5, the scheduler 40 of node 22 keeps a variable transmission deadline d, which monitors the time to the scheduling deadline. For each transmission time interval (TTI), transmission deadline variable d is reduced by TTI (e.g., act 72-2). Each time frame(s) are scheduled (e.g., transmitted from node 22 to 30), transmission deadline variable d is increased by $n*T_{IntArr}$, where n=number of frames scheduled, and wherein $T_{IntArr}$=is the frame interarrival time.

The connection on whose behalf the scheduler 40 is working could participate in or be associated with one of several different types of services. For example, the connection may be associated with a service which is of the type in which the frame inter-arrival time is constant. For example, the service may be of a type which utilizes a codec, and the codec may have a constant frame inter-arrival time. On the other hand, as another example, for other types of services the frame inter-arrival time may vary. The distinction between constant and variable frame inter-arrival time is significant from the vantage point of, e.g., adjusting or updating the value of transmission deadline variable d on occasions such as those reflected by act 70-4 and 74-4. As will be recalled, at act 70-4 the initial transmission routine 70 updates the value of transmission deadline variable d by adding the product of the number of packets transmitted and the packet inter-arrival time to the initialized value of transmission deadline variable d. At act 74-4 the packet transmission routine 74 increases the transmission deadline variable d by an amount comparable to a product of a number of frame(s) transmitted and a frame inter-arrival time.

Thus, in an example embodiment, the scheduler 40 is able to discern the correct frame inter-arrival time to use for updating the value of transmission deadline variable d. In an example implementation of this embodiment, when the frame inter-arrival time is variable, the program determines the frame-interarrival time with reference to information carried in the packets. Such information can be information carried in a packet header, such as a time stamp, for example. In an example implementation, the real time protocol (RTP) header information can be used for the scheduling decision. Assuming packet centric OSI layer 2 (L2), the RTP header can be accessible in a node such as a radio base station from the layer 2 protocol data unit (PDU). Using the thirty two bit timestamp in the RTP header, the scheduler 40 can base the deadline variable d on the timestamp, instead of counting frames and interarrival times. This alternative has the benefit that is also works for codecs without fixed frame interarrival times.

In other words, instead of always adding and subtracting a fixed unit of "interr-arrival time" from "d", the time stamp provides the possibility to support also codecs with variable interarrival times. A prerequisite is that node 22 knows the clock frequency used to step the timestamp, i.e. the unit of time for each step of the 32-bit timestamp. Then, by letting "d" be the difference in playout time of the first and last packet transmitted to the terminal 30 in the initial burst, the scheduler 40 in node 22 can initialize "d" to the playout buffer size in terminal 30. Then, "d" is reduced with the same clock frequency used to step the time stamp. When zero, the scheduling deadline is reached, i.e. a new packet must be transmitted. For each packet transmitted, the scheduler 40 adds the difference in the transmitted time stamp and the time stamp of previously transmitted packet to transmission deadline variable d.

If packets are lost in the transport before the scheduler 40, this has to be identified and the deadline d adjusted accordingly to avoid that packets are scheduled too soon. In an example variation, the node 22 can also detect a lost packet and, upon such detection, increase the transmission deadline variable d by the packet inter-arrival time (e.g., the frame inter-arrival time). To this end, lost packet detection process 66 shown in FIG. 4 is an optional process which can work in conjunction with scheduler 40. One example way of implementing the lost packet detection process 66 involves checking information carried in a packet header, such as a sequence number.

Figure 6:
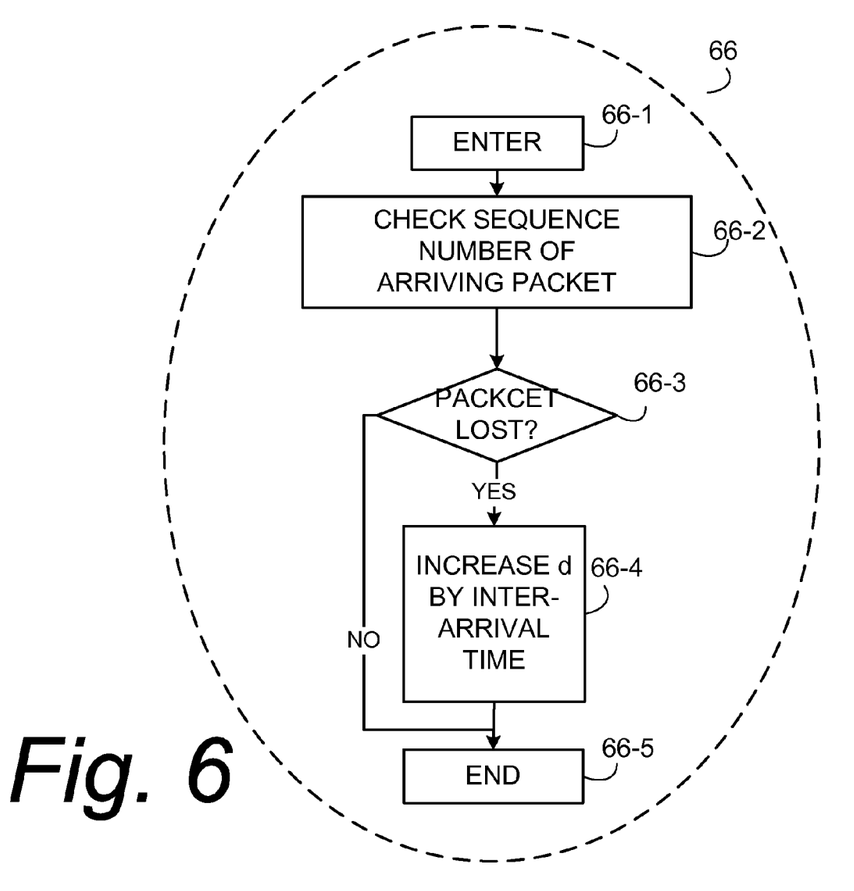
FIG. 6 is a flowchart showing example acts performed in conjunction with a packet loss detection process.

Example, representative, non-limiting acts of lost packet detection process 66 are illustrated in FIG. 6. Act 66-1 reflects entry of lost packet detection process 66, which can be summoned or prompted, e.g., upon packet arrival at node 22 by a process such as packet reception process 60. Act 66-2 involves checking header information of the arriving packet, e.g., sequence number of the arriving packet. In an example implementation similar to that described above with respect to the variable frame inter-arrival time, the real time protocol (RTP) header information can be used for the scheduling decision. Assuming packet centric OSI layer 2 (L2), the RTP header can be accessible in a node such as a radio base station from the layer 2 protocol data unit (PDU). Using the sixteen bit sequence number in RTP header, the lost packet detection process 66 can detect a missing packet and use it to correct the scheduling deadline d, as explained below.

Act 66-3 comprises determining whether the sequence number of the arriving packet is in the expected order, e.g., follows the sequence number of the immediately preceding packet. If the sequence number is not the anticipated sequence number, as act 66-3 the lost packet detection process 66 determines that a (intervening) packet was lost. Consequently, as act 66-4 the packet reception process 60 increases the value of transmission deadline variable d by a value corresponding to the packet inter-arrival time (e.g., the frame inter-arrival time). Thereafter, the lost packet detection process 66 process can cease until being called or entered again upon receipt of a new packet(s) from transmission chain 24.

Another or alternate solution to the lost packet problem is to use a packet loss counter in the RTCP receiver reports to identify packet loss and adjust transmission deadline variable d.

Yet another or alternate solution to the lost packet problem is to have feedback from the playout buffer 38 to scheduler 40 if the playout buffer 38 starts to grow due to packets lost before (e.g., in the transmission chain 24) the scheduler 40. The playout buffer 48 growing in such circumstances is explained by an example scenario in which the playout buffer 48 of the terminal 30 can use a timestamp in the RTP header of the packet to determine playout time. Thus, playout buffer 48 will preserve the time relation between packets, but scheduler 40 in node 22 will not have this knowledge and will schedule as if no packet was lost. Therefore, the playout buffer 48 will grow. The feedback in this alternate solution is a form of flow control, e.g., the terminal 30 requesting node 22 to adjust the value of transmission deadline variable d.

There are many advantages of the technology herein described. Example, non-limiting advantages, attendant to at least some (though not necessarily all) embodiments and implementations, include the following:

Reduced probability of playout buffer drainage. Basing the scheduling decision on the playout time for each packet gives a more precise scheduling by eliminating the effect of any jitter in the incoming traffic.

No prebuffering delay in client. Since the scheduling is done in such a way that prebuffering in the client is not needed, playout can start directly upon receiving the first data frame. This reduces the initial delay until playout begins, since buffering is only done in one place, the sending node (e.g., radio base station).

Simplified playout buffer design. By moving the prebuffering point from the client to the sending node (e.g., radio base station), there is no need for the terminal to be aware of the expected jitter of the transport chain. This avoids signaling of this information from the network to the terminal.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A node of a telecommunications network which receives, over a transmission chain subject to packet jitter, packets of a connection involving a client device, the node comprising:

a packet buffer configured to store the packets received over the transmission chain prior to transmission of the packets to the client device;

a scheduler configured to schedule the transmission of the packets from the packet buffer over a channel to the client device in accordance with a timing consideration of the client device, the timing consideration of the client device being avoidance of drain of a playout buffer of the client device;

wherein the scheduler comprises a process configured to execute a software program comprising instructions stored on a tangible media, and wherein when executed the instructions result in performance of the following acts:

maintaining a transmission deadline variable indicative of a time at which transmission of a packet(s) should occur from the scheduling buffer to prevent the playout buffer of client device from draining;

for each transmission time interval (TTI) of the connection, decreasing the transmission deadline variable by an amount comparable to the transmission time interval (TTI);

for each transmission of a frame(s), increasing the transmission deadline variable by an amount comparable to a product of a number of frame(s) transmitted and a frame inter-arrival time.

2. The apparatus of claim 1, wherein the frame inter-arrival time is a constant.

3. The apparatus of claim 1, wherein the frame inter-arrival time is variable, and wherein when executed the instructions result in determining the frame-interarrival time with reference to information carried in the packets.

4. The apparatus of claim 3, wherein the information carried in the packets is a time stamp.

5. The apparatus of claim 1, wherein when executed the instructions result in performance of the following further acts:

detecting a lost packet;

increasing the transmission deadline variable by the frame inter-arrival time when the lost packet is detected.

6. A method of operating a node of a communications network, the method comprising:

receiving, over a transmission chain subject to packet jitter, packets of a connection involving a client device;

storing the packets received over the transmission chain in a packet buffer; scheduling transmission of the packets from the packet buffer over a channel to the client device in accordance with a timing consideration of the client device, the timing consideration of the client device being avoidance of drain of a playout buffer of the client device;

maintaining a transmission deadline variable indicative of a time at which transmission of a packet(s) should occur from the scheduling buffer to prevent the playout buffer of client device from draining;

for each transmission time interval (TTI) of the connection, decreasing the transmission deadline variable by an amount comparable to the transmission time interval (TTI);

for each transmission of a frame(s), increasing the transmission deadline variable by an amount comparable to a product of a number of frame(s) transmitted and a frame inter-arrival time.

7. The method of claim 6, wherein the frame inter-arrival time is a constant.

8. The method of claim 6, wherein the frame inter-arrival time is variable, and further comprising determining the frame-interarrival time with reference to information carried in the packets.

9. The method of claim 8, wherein the information carried in the packets is a time stamp.

10. The method of claim 6, further comprising:
 detecting a lost packet;
 increasing the transmission deadline variable by the frame inter-arrival time when the lost packet is detected.

11. A node of a telecommunications network which receives, over a transmission chain subject to packet jitter, packets of a connection involving a client device, the node comprising:
 a packet buffer configured to store the packets received over the transmission chain prior to transmission of the packets to the client device;
 a scheduler configured to schedule the transmission of the packets from the packet buffer over a channel to the client device in accordance with a transmission deadline, the transmission deadline being maintained by the scheduler as an indication of a time at which transmission of a packet(s) should occur from the scheduling buffer to prevent the playout buffer of client device from draining, the scheduler further being configured to adjust the transmission deadline in accordance with transmission of frames and expirations of transmission time intervals.

12. The apparatus of claim 11, wherein the scheduler is configured to prebuffer an amount of data that corresponds to a maximum jitter allowed for a connection.

13. A method of operating a node of a communications network, the method comprising:
 receiving, over a transmission chain subject to packet jitter, packets of a connection involving a client device;
 storing the packets received over the transmission chain in a packet buffer;
 scheduling transmission of the packets from the packet buffer over a channel to the client device in accordance with a transmission deadline;
 maintaining the transmission deadline as an indication of a time at which transmission of a packet(s) should occur from the scheduling buffer to prevent the playout buffer of client device from draining, thereby adjust the transmission deadline in accordance with transmission of frames and expirations of transmission time intervals.

14. The method of claim 13, further comprising prebuffering in the packet buffer an amount of data that corresponds to a maximum jitter allowed for a connection.

15. The apparatus of claim 13, wherein the scheduler is configured to schedule the transmission of the packets from the packet buffer over the channel to the client device in accordance with a transmission deadline that varies with time depending on time each packet has spent in the network before reaching the scheduler.

16. The apparatus of claim 15, wherein the scheduler is configured to prebuffer an amount of data that corresponds to a maximum jitter allowed for a connection.

17. The method of claim 13, further comprising
 scheduling transmission of the packets from the packet buffer over the channel to the client device in accordance with a transmission deadline that varies with time depending on time each packet has spent in the network before reaching the scheduler.

18. The method of claim 17, further comprising prebuffering in the packet buffer an amount of data that corresponds to a maximum jitter allowed for a connection.

* * * * *